UNITED STATES PATENT OFFICE.

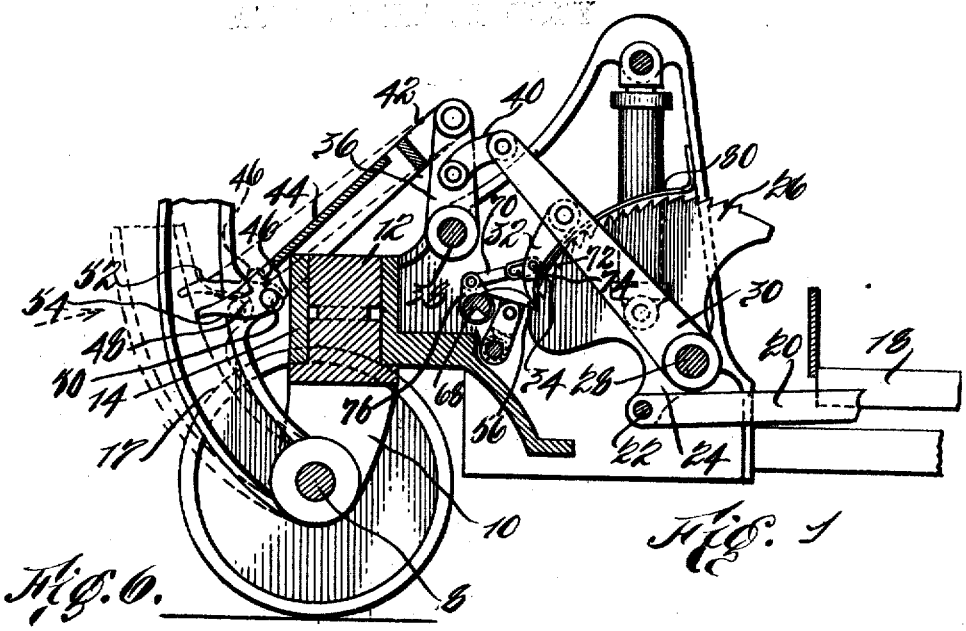

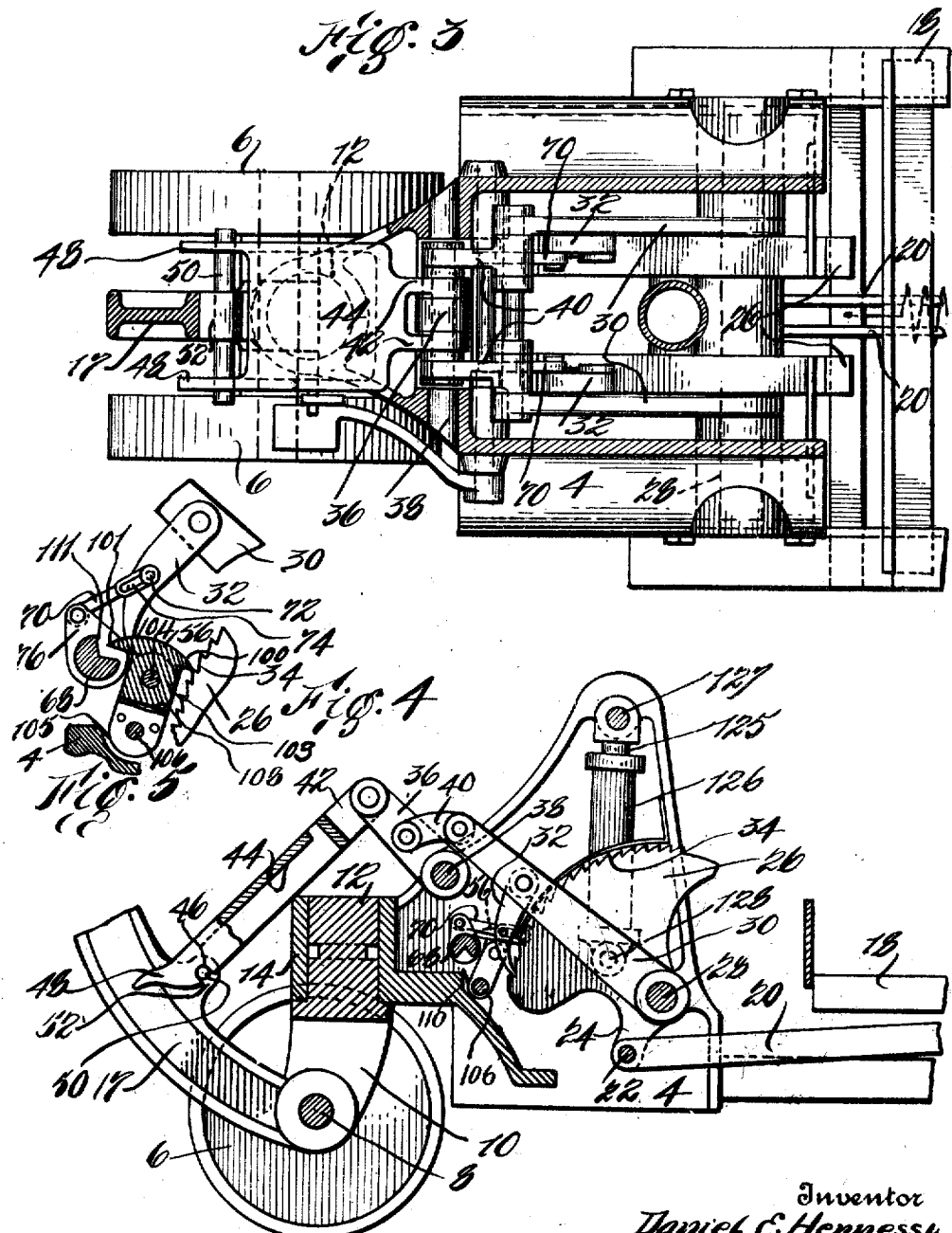

DANIEL E. HENNESSY, OF CUDAHY, WISCONSIN, ASSIGNOR TO HERBERT W. COWAN, J. LEWIS WYCKOFF, AND EDWARD N. WHITE, TRUSTEES DOING BUSINESS AS THE COWAN TRUCK COMPANY.

ELEVATING-TRUCK.

1,361,257.　　Specification of Letters Patent.　　Patented Dec. 7, 1920.

Application filed May 24, 1917, Serial No. 170,658. Renewed June 5, 1920. Serial No. 386,921.

*To all whom it may concern:*

Be it known that I, DANIEL E. HENNESSY, a citizen of the United States, residing at Cudahy, Wisconsin, have invented certain new and useful Improvements in Elevating-Trucks, of which the following is a clear, full, and exact description.

This invention relates to improvements in elevating trucks, and more especially to trucks in which the elevating mechanism is operated from the handle which is used to pull or push and to steer the truck.

The present invention is designed as an improvement in that type of truck employing a step-by-step or jack-operated mechanism for raising the load supporting member of the truck, and in the preferred embodiment comprises a ratchet mechanism arranged to be operated from the steering and pulling handle of the truck. An object of the present invention is to provide means for connecting the pawl and ratchet mechanism to the handle, which means shall be of such nature that the connection can be made by a simple movement of the handle and can be readily broken whether the load supporting member is in elevated, lowered, or intermediate position.

Further objects are to provide a simple and effective power-multiplying connection between the elevating mechanism and the handle of an elevating truck; and to provide means by which said power-multiplying connection may either be detached from the handle or rendered inoperative as to the elevating mechanism.

Further objects and advantages of my invention will appear from the following detailed description thereof when read in connection with the drawings, in which—

Figure 1 is a view in cross section through the front end of an elevating truck embodying my invention;

Fig. 2 is a side view in elevation thereof;

Fig. 3 is a plan view thereof;

Fig. 4 is a view similar to Fig. 1, with parts in a different operative position;

Fig. 5 is a detailed view of the ratchet and pawls in released position; and

Fig. 6 shows a further detail of the structure.

The truck illustrated in the accompanying drawings comprises a main frame 2 having at its forward end a frame or casing 4 for supporting the operating members of the elevating mechanism of the truck. Front supporting and steering wheels 6 are carried upon an axle 8 extending through a forked steering wheel support 10, which has a shouldered upper extension 12 swiveled in a vertical bearing 14 at the front of the frame or casing 4. Between the forked members 10 of the steering wheel, a handle 17 is pivoted on the axle 8 to swing in a vertical plane, and serves as a means for pushing or pulling and steering the truck. The load carrying member 18 of the truck, which extends substantially parallel to the truck frame 2, is arranged to be raised with respect thereto by any suitable means, such, for instance, as shown in the patent to George P. Taylor #1,122,439, Dec. 29, 1914, and need not be here described. It will be understood that such means for elevating the member 18 will be operated by the horizontal travel of a pair of links 20 connected at their forward ends by pivot 22 to the arms 24 of the segmental ratchets 26 mounted on the cross shaft 28. The rocking of the ratchets 26 about the axis of the cross shaft 28 in a counter-clockwise direction, as viewed in the drawing, effects the elevation of the load carrying member 18 with respect to the frame 2.

The means for effecting the step-by-step movement of the segmental ratchets about their axes contemplated in the present invention, consists of a power-multiplying arrangement comprising, in the illustrated form thereof, a pair of arms 30 pivotally mounted at one end on the cross shaft 28, one of said arms being mounted adjacent each ratchet. Each of said arms carries at an intermediate point of its length a pivoted pawl 32 for engagement with the teeth 34 of the adjacent ratchet. A lever 36, fulcrumed at its lower end at 38 on an axis extending transversely of the frame 4, parallel to the cross shaft 28, is connected to the arms 30 by means of a pair of short links 40 pivotally connected at their opposite ends to the intermediate portion of the lever 36 and the ends of the arms 30, respectively. The upper end or free end of the lever 36 has pivoted thereto at opposite sides, the upper ends of the coupling links 42, said links being united by a plate or web 44 adapted to rest on the upper edge of the vertical bearing 14. The free end of each coupling link is provided on its underside with a recess 46, thus providing a pair of hooked members 48 for engaging over the pins 50 which are transversely mounted in the handle 17 on a lug 52 formed intermediate the length thereof.

The lower extremity of each coupling link is curved as shown at 54, and the pin 50 is so positioned that when the handle is swung upward to the position shown in dotted line in Fig. 1, the pin 50 will strike the curved ends of the links 42 as the latter are held in position by means of the web 44 resting on the bearing 14, and by a cam action will raise the links and hold them in such position until the pin is in registration with the recesses 46, into which the pin 50 will be received as the links drop down. The handle 16 having thus been connected, by the interlocking engagement of the hook 48 and pin 50, to the lever 36, and therefore to the arms 30 and the ratchets 26, the swinging of the handle in a vertical plane about the axle 8 causes the lever 36 and the arms 30 to oscillate and thus swing the ratchets 26 about their axis, thus elevating the load carrying member 18 in the well known manner. When the load has been elevated to the desired height, the operator may disconnect the handle from the elevating mechanism by an upward kick on one of the hooks 48, thus rendering the handle free for steering the truck.

The load is maintained in its elevated position preferably by preventing the return movement of the ratchet members 26. This is accomplished by a pair of retaining pawls, such as 56, one for each ratchet member. The construction and operation of one of said retaining pawls will be understood more clearly by referring to Figs. 1, 4 and 5. Each retaining pawl comprises a hooked portion 100 and a tail portion 101 forming an integral part of a depending shank 103, said shank being pivoted at 104 to a pawl-carrier 105. The pawl-carrier 105 has trunnions 106 mounted in the frame 4. Sloping shoulders 107 upon said pawl-carrier coact with a flat shoulder 108 on said pawl to permit of a slight rocking relative movement between said pawl and pawl-carrier. A coiled spring 110 has one end bearing against the shoulder of the frame 4 and is wound around the trunnion of said pawl-carrier with its other end bearing against the foremost lower corner of the pawl shank 103. This spring tends to tilt the pawl 56 in a clockwise direction around its pivot 104 and also to rock the pawl-carrier 105 on its trunnions 106 in a clockwise direction to maintain hook 100 in engagement with the teeth 34 of ratchet member 26. A pawl controlling shaft 68 is mounted in the frame 4 and has fixed at one end thereof a treadle 58. This shaft is also provided with notches, such as 111, adapted to come beneath the tail portion 101 of each pawl 56 when said shaft is turned by the depression of the treadle. A spring 112 normally keeps said treadle in its upper position against a stop 113 on said frame 4. In this upper position of the treadle, shaft 68 has its solid cylindrical portion beneath the tail 101 of pawl 56 but when said treadle 58 is depressed to bear against stop 114 also on frame 4, it will be understood that the notches 111 of said shaft 68 will be brought beneath the tail portion 101 of each pawl 56, as shown in Fig. 4, whereby said pawl may freely tilt in a counter-clockwise direction upon its pivot 104 and thus allow the ratchet teeth 34 to move upwardly for the descent of the load. Arms, such as 76, are fixed to shaft 68 and are connected by links such as 70, Fig. 4, having a slotted end 74 with a pin 72 upon each of the driving pawls 32. The pin-and-slot connection between links 70 and pawls 32 permits of the free movement of the latter in operating the ratchet member 26 during the elevation of the load, and on the other hand, when said shaft 68 is turned by the depression of the treadle 58, links 70 will pull pawls 32 out of driving engagment with the ratchet teeth 34. A dash pot or release check 125, 126, of suitable construction, is connected between the frame 4 and the ratchet member 26 to cushion the descent of the load member 18. As shown this dash pot comprises a piston 125 pivotally connected at 127 to the frame 4 and a cylinder 126 pivotally connected at 128 to the ratchet members 26.

The operation of the pawl-retaining and releasing means is as follows, it being understood that the mechanism is duplicated at each side of the machine: So long as treadle 58 is in its upper position against stop 113, the solid cylindrical portion of shaft 68 will lie beneath the tail 101 of pawl 56 and prevent the tipping of said pawl upon its pivot 104. The driving pawl 32 will also be in a position for active engagement with the ratchet teeth 34, and this position of the parts is shown in Figs. 1 and 4. As the rotation of the ratchet member 26 in a counter clockwise direction is effected by the action of the driving pawl 32, the holding pawl 56 acts after each step-by-step movement against the teeth 34 to prevent the return of said ratchet member 26. The downward movement of the teeth 34 against the hook 100 of the pawl 56 will tilt said pawl slightly on its pivot 104 and will, in addition, cause a bodily swinging movement of the pawl carrier 105 on its trunnion 106 toward the front of the machine, the tail portion 101 during this movement sliding over the cylindrical portion of the shaft 68, said pawl and pawl-carrier of course being returned into holding position by the spring 107 after the passage of each tooth 34.

It will be understood that when a heavy load is on the load-supporting member 18, tending to lower the same and thus swing the ratchet member 26 in a clockwise direction, the teeth 34 will bear upwardly with considerable force against the hooked portion 100 of the holding pawl 56. The portion 100 and the teeth 34 preferably have the hook-like coaction shown to prevent this upward pressure of the teeth 34 from effecting any disengagement of the retaining pawl 56. It will be clear that if pawl 56 were integral with the pawl-carrier 105 so as to be rockable only on the trunnions 106, considerable force would be required on the part of the operator to pull said retaining pawl away from the teeth 34, due to the upward pressure of the latter. Furthermore, such a forceful disengagement of the retaining pawl would soon wear out the hook 100 and teeth 34. But since the retaining pawl 56 has a secondary pivot at 104 on the pawl-carrier located so as to furnish an effective moment to the pressure of teeth 34 against the hook 100 in tipping the pawl, no forceful disengagement of pawl 56 is required. By depressing treadle 58, the shaft 68 is turned to bring notch 111 beneath tail 101 of pawl 56. This position is shown in Fig. 5. The pawl 56 is then free to rock on its secondary pivot 104 under the upward pressure of teeth 34. The turning of shaft 68 also simultaneously pulls the driving pawls 32 out of active engagement with teeth 34, whereby the ratchet 26 will return to its upper position and the load member 18 will descend. The descent will be cushioned by the dash-pot 125, 126.

It is to be understood that while I have herein disclosed a specific type of means for attaining the objects set forth, my invention is not limited to this embodiment thereof but may be modified in its details and may be applied to trucks of different construction than that illustrated.

What I claim is:—

1. In an elevating truck provided with a movable handle, load elevating mechanism comprising in combination a ratchet, an oscillatory arm and a pawl for said ratchet on said arm, and power-multiplying means connected to said arm and arranged for detachable engagement with said handle.

2. In an elevating truck comprising a truck frame and a load supporting member, and provided with a pivoted handle, elevating means for raising the said load supporting member and power-multiplying means for operatively connecting said handle to said elevating means, said power-multiplying means being detachable from said handle, to permit the use of the handle in steering the truck, and from said elevating means to permit the load supporting member to descend.

3. In an elevating truck comprising a truck frame and provided with a pivoted handle, load-elevating mechanism comprising a ratchet, an arm pivoted at one end on said frame, a driving pawl for said ratchet on said arm, means for operatively connecting said arm with the handle of the truck, and treadle-controlled means for moving said pawl into and out of operative relation with said ratchet.

4. In an elevating truck comprising a truck frame and provided with a pivoted handle, load-elevating mechanism comprising a ratchet, an arm pivoted on said frame, a driving pawl for said ratchet on said arm, and a link connected to said arm and arranged to detachably engage said handle.

5. In an elevating truck comprising a truck frame and provided with a pivoted handle, load-elevating mechanism comprising a ratchet, an arm pivoted on said frame, a driving pawl for said ratchet on said arm, a link connected to said arm and arranged to detachably engage said handle, and treadle-controlled means for moving said pawl into and out of operative relation to said ratchet.

6. In an elevating truck comprising a truck frame and provided with a pivoted handle, load-elevating mechanism comprising a ratchet mounted to swing about an axis, an arm pivoted to swing about the axis of said ratchet, a driving pawl for said ratchet carried by said arm, and means for detachably connecting said arm and the handle of the truck.

7. In an elevating truck comprising a truck frame and provided with a pivoted handle, load-elevating mechanism comprising a ratchet mounted to swing about an axis, an arm pivoted to swing about the axis of said ratchet, a driving pawl for said ratchet carried by said arm, and a hook member connected to said arm and arranged to detachably engage the handle of the truck.

8. In an elevating truck comprising a truck frame provided with a pivoted handle, load-elevating mechanism comprising a ratchet, an arm pivoted on said frame, a driving pawl for said ratchet on said arm, a lever fulcrumed on said frame, a link connecting said arm and lever, and means carried by said lever for detachable engagement with the handle of the truck.

9. In an elevating truck comprising a truck frame provided with a pivoted handle, load-elevating mechanism comprising a ratchet, an arm pivoted at one end on said frame, a driving pawl on said arm for said ratchet, a lever fulcrumed at one end on said frame, a link connecting the other end of said arm with an intermediate portion of said lever, and means for detachably engaging the free end of said lever with the handle of the truck.

10. In an elevating truck, a truck frame, a pivoted handle, a load-supporting member, mechanism for raising said load-supporting member and means for effecting an operative connection between said mechanism and said handle comprising a series of power-multiplying members pivoted at one end on said frame, operating connections between the other end of each member of the series and an intermediate portion of the next succeeding member.

11. In an elevating truck, a truck frame and a load-supporting member, means for raising said load-supporting member comprising a ratchet, a series of members pivoted at one end on said frame, the opposite end of each member of the series being connected to the next succeeding member at an intermediate point thereof, and a driving pawl pivoted at an intermediate point of the first member of the series for engagement with said ratchet.

12. In an elevating truck, a truck frame and a load-supporting member, means for raising said load-supporting member comprising a ratchet, a series of members pivoted at one end on said frame, the opposite end of each member of the series being connected to the next succeeding member at an intermediate point thereof, the last member of the series constituting a handle for the truck, and a driving pawl pivoted at an intermediate point of the first member of the series for engagement with said ratchet.

13. An elevating truck, comprising in combination a frame, a handle pivoted on said frame to swing in a vertical plane, a load-supporting member mounted on said frame, pawl and ratchet mechanism for elevating said load-supporting member, said mechanism comprising an oscillatory arm on which said pawl is mounted, a link connected at one end to said arm, the other end of the link and the handle of the truck having coöperating interlocking means arranged to be brought into engagement by an upward movement of said handle.

14. An elevating truck, comprising in combination a main frame, a handle pivoted on said frame to swing in a vertical plane, a load-supporting member mounted on said frame, pawl and ratchet mechanism for elevating said load-supporting member, a lever fulcrumed at one end on said frame and connected to said pawl and ratchet mechanism, a link pivotally connected at one end to the free end of said lever, said handle having a transversely extending pin thereon, the other end of said link having a recess on its underside to receive said pin, the extremity of said end being curved, coöperating means on said link and on said truck frame for holding said curved end in the path of said pin whereby on an upward swing of said handle said pin will engage said curved portion, thus raising said link, and a continued upward movement of the handle will permit said link to drop back into position with said pin in said recess to cause said lever to partake of the swinging movement of said handle.

15. In an elevating truck, a truck frame, a handle therefor pivoted to swing in a vertical plane, a load-elevating mechanism on said truck frame, means for operating said mechanism from the handle comprising a pair of arms pivotally mounted on said frame, a lever fulcrumed on said frame, a pair of links connecting said arms to said lever, a pair of coupling links pivotally mounted at one end on the free end of said lever, means on said links for engagement by said handle to connect the links and handle, and means connecting said coupling links and coöperating with the truck frame to hold the links in position to be engaged by the handle.

Signed at Holyoke, Mass., this 8th day of May, 1917.

DANIEL E. HENNESSY.